(12) United States Patent
Betz

(10) Patent No.: US 8,065,925 B2
(45) Date of Patent: Nov. 29, 2011

(54) SENSOR UNIT HAVING A MEASURING PROBE AND A HOUSING PART WITH SENSORS AND A COMPUTING UNIT INTEGRATED IN THE HOUSING PART

(75) Inventor: Oliver Betz, Gröbenzell (DE)

(73) Assignee: Systec Controls Mess- und Regelungstechnik GmbH, Puchheim (DE)

(*) Notice: Subject to any disclaimer, the term of this patent is extended or adjusted under 35 U.S.C. 154(b) by 0 days.

(21) Appl. No.: 11/995,548

(22) PCT Filed: Jul. 13, 2006

(86) PCT No.: PCT/DE2006/001219
§ 371 (c)(1),
(2), (4) Date: Jun. 23, 2008

(87) PCT Pub. No.: WO2007/006297
PCT Pub. Date: Jan. 18, 2007

(65) Prior Publication Data
US 2009/0217752 A1  Sep. 3, 2009

(51) Int. Cl.
*G01F 1/46* (2006.01)
*G01F 1/34* (2006.01)
*G01G 21/00* (2006.01)

(52) U.S. Cl. ............ 73/861.65; 73/866.5; 73/861.42; 128/205.27

(58) Field of Classification Search .......... None
See application file for complete search history.

(56) References Cited

U.S. PATENT DOCUMENTS

| | | | | |
|---|---|---|---|---|
| 3,895,531 | A * | 7/1975 | Lambert | 73/861.66 |
| 3,981,193 | A * | 9/1976 | Goulet | 73/861.66 |
| 4,304,137 | A * | 12/1981 | Mott | 73/861.65 |
| 4,444,060 | A * | 4/1984 | Yamamoto | 73/861.66 |
| 4,624,146 | A * | 11/1986 | Nakagawa | 73/861.66 |
| 4,890,492 | A * | 1/1990 | Andrejasich et al. | 73/292 |
| 4,920,808 | A * | 5/1990 | Sommer | 73/861.42 |
| 5,001,638 | A * | 3/1991 | Zimmerman et al. | 701/14 |
| 5,438,880 | A * | 8/1995 | Washburn | 73/861.65 |
| 5,483,839 | A * | 1/1996 | Meunier | 73/861.66 |
| 5,597,963 | A * | 1/1997 | Smart et al. | 73/861.65 |
| 5,736,651 | A * | 4/1998 | Bowers | 73/861.66 |
| 5,913,250 | A * | 6/1999 | Wible | 73/861.65 |
| 6,044,716 | A * | 4/2000 | Yamamoto | 73/861.66 |
| 6,189,390 | B1 * | 2/2001 | Platt | 73/861.66 |
| 6,237,426 | B1 * | 5/2001 | Gryc et al. | 73/861.66 |
| 6,321,166 | B1 * | 11/2001 | Evans et al. | 702/50 |
| 6,425,293 | B1 * | 7/2002 | Woodroffe et al. | 73/756 |
| 6,452,542 | B1 * | 9/2002 | Bachinski et al. | 342/357.06 |
| 6,487,918 | B1 * | 12/2002 | DeAngelis | 73/861.66 |
| 6,609,825 | B2 * | 8/2003 | Ice et al. | 374/138 |

(Continued)

*Primary Examiner* — Harshad Patel
(74) *Attorney, Agent, or Firm* — Laurence A. Greenberg; Werner H. Stemer; Ralph E. Locher

(57) ABSTRACT

The static pressure, the differential pressure, and the temperature must be known in order to be able to determine the mass flow rate, the volumetric flow under standard conditions, or the enthalpy flow of a fluid. Desired variables are detected by individual sensors located in an integrated sensor unit, and the values detected by the individual sensors are then processed in a computing unit that is also integrated in the sensor unit. The sensor unit outputs a value, which also takes other parameters and/or physical constants into account, to a control unit that is connected downstream. Some of the computing is advantageously done in the sensor unit so that some load is relieved from the control unit.

11 Claims, 2 Drawing Sheets

U.S. PATENT DOCUMENTS

| | | | |
|---|---|---|---|
| 6,634,242 B2 * | 10/2003 | Cha et al. | 73/861.66 |
| 6,868,741 B2 * | 3/2005 | Harman | 73/861.65 |
| 6,883,389 B2 * | 4/2005 | Eldridge | 73/861.65 |
| 7,010,970 B2 * | 3/2006 | Rediniotis et al. | 73/170.11 |
| 7,201,067 B2 * | 4/2007 | Kurtz et al. | 73/861.65 |
| 7,243,556 B2 * | 7/2007 | Gryc et al. | 73/861.65 |
| 7,406,880 B2 * | 8/2008 | Orleskie et al. | 73/861.65 |
| 7,798,017 B2 * | 9/2010 | Betz | 73/861.65 |
| 2002/0124658 A1 * | 9/2002 | Schmidt | 73/856 |
| 2003/0101827 A1 * | 6/2003 | Cha et al. | 73/861.66 |
| 2003/0139690 A1 * | 7/2003 | Aebli et al. | 600/587 |
| 2003/0145661 A1 * | 8/2003 | Taranto | 73/861.65 |
| 2003/0172746 A1 * | 9/2003 | Walker et al. | 73/861.65 |
| 2004/0173030 A1 * | 9/2004 | Harman | 73/861.65 |
| 2005/0039545 A1 * | 2/2005 | Eldridge | 73/861.04 |
| 2006/0060001 A1 * | 3/2006 | Kurtz et al. | 73/861.65 |
| 2007/0107510 A1 * | 5/2007 | Agami et al. | 73/182 |
| 2008/0202256 A1 * | 8/2008 | Betz | 73/861.42 |
| 2008/0285620 A1 * | 11/2008 | Benning et al. | 374/138 |
| 2009/0211372 A1 * | 8/2009 | Betz | 73/861.65 |

* cited by examiner

SENSOR UNIT HAVING A MEASURING PROBE AND A HOUSING PART WITH SENSORS AND A COMPUTING UNIT INTEGRATED IN THE HOUSING PART

TECHNICAL FIELD

The invention relates to the technical field of measuring mass flow or volumetric flow under standard conditions and/or the thermal load and/or the level of harmful substances of a fluid.

PRIOR ART

Hot film anemometers are known for measuring mass flow. In this type of sensor, the gas flow is directed over a heated area of the sensor. The heated area cools down on account of the flowing gas. The value of this cooling is the initial basis for determining the mass flow.

Particles or condensates are also often conveyed by the gas and lead to deposits on the heated areas which disadvantageously produces a drift in the measured values during the period of operation.

DISCLOSURE OF THE INVENTION

Technical Problem

It is an object of the invention to provide a sensor for measuring the mass flow, in which particles or condensates in the fluid do not cause drift in the measured values.

Technical Solution

The considerations which led to the development of the present invention are based on the fact that, in a sensor which does not have areas past which the fluid and the entrained particles flow, no deposits can form in principle.

The invention is based on the principle of ram-pressure probe measurement, in which a reproducible differential pressure is produced as a function of the speed and the density of the fluid.

The static pressure, the differential pressure and the temperature need to be known in order to be able to determine the mass flow, the volumetric flow under standard conditions or the enthalpy flow of a fluid.

According to the invention, these variables are detected by individual sensors located in an integrated unit and the values detected by the individual sensors are subsequently processed in a computing unit which is likewise integrated.

The sensor unit outputs a value which already takes into account other parameters and/or physical constants to a downstream control unit. This means that part of the computing is advantageously performed in the sensor unit and the control unit is relieved.

One development of the invention provides that a further sensor is integrated, which enables an analysis of the fluid composition. This permits detection of levels of harmful substances in engine exhaust gases, for example.

Advantageous Effects

The measured variables stated are needed, for example, for the optimized control of an internal combustion engine. Since the "drifting" of measured values has disadvantageous effects in particular in the case of this application, the present invention advantageously overcomes the disadvantages of the prior art.

Integrating all the sensors and the computing unit has the advantage of a compact sensor unit with a long-term stability of the measured values, which can be used at many locations and for many applications.

Figure 1:
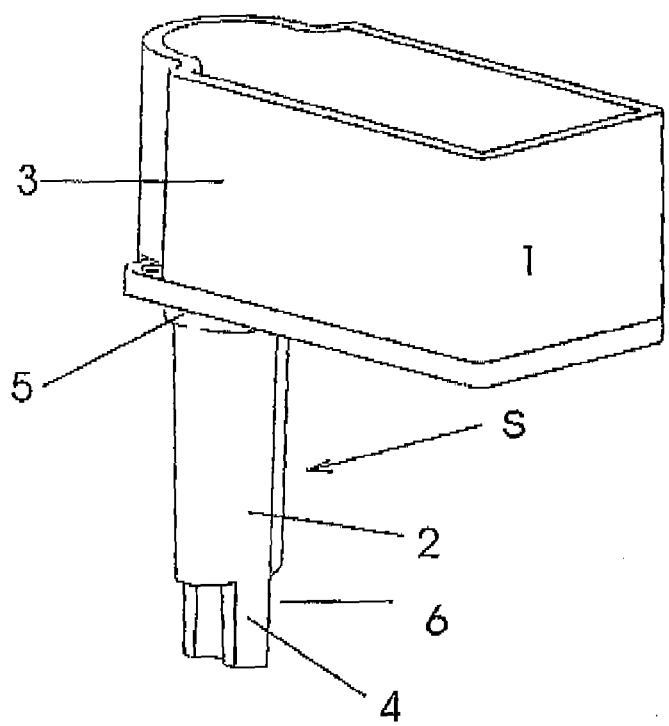
FIG. 1 shows, in perspective illustration, the sensor unit.

The sensor unit 1 has a measuring probe 2 which comes into contact with the fluid and has a housing part 3 which is located outside the fluid.

The individual sensors (not shown here) and the computing unit are located in the housing part 3.

The sensor unit 1 is provided to be attached directly to a fluid-conducting line. The measuring probe 2 can project into the fluid flow through an opening in the fluid-conducting line. A seal 5 sealing the opening is provided on the underside of the housing part 3.

The measuring probe 2 is, at least partially, in the form of a ram-pressure probe 4. The fluid has a direction of flow according to the arrow S. In a known manner, a ram-pressure area 6 causes a flow-dependent pressure differential at two measurement openings.

Figure 2:
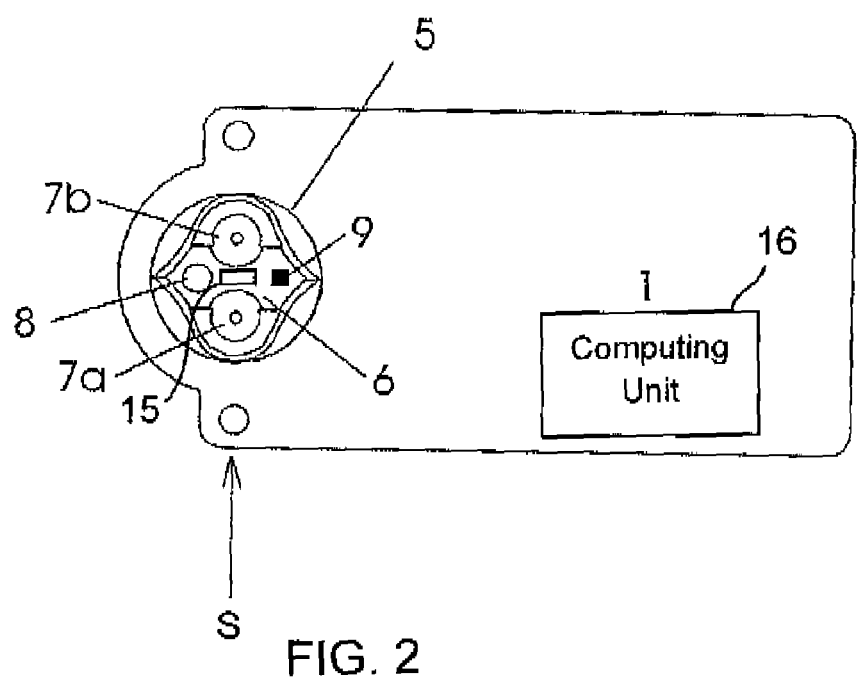
FIG. 2 shows the view of the sensor unit from below and
FIG. 3 shows a further embodiment of the sensor unit.

FIG. 2 is a view of the sensor unit 1 from below. This illustration shows the two measurement openings 7a and 7b of the ram-pressure probe.

Another measurement opening 8 for detecting the static pressure is located at the lower end of the ram-pressure area 6. The measurement opening 8 is arranged such that the fluid flows past it in a laminar manner.

A temperature sensor 9 is also located in the measuring probe 2. The temperature sensor is arranged, close to the surface, in the measuring probe 2, which enables it to quickly detect temperature changes in the fluid. In the illustrated example, the temperature sensor 9 is located in the ram-pressure surface. This ram-pressure surface is composed of relatively little material and thus follows the temperature changes in the fluid in near real-time.

The temperature sensor 9 is preferably arranged at a location past which the fluid flows in a laminar manner. This prevents particles transported in the fluid from forming an isolating layer on the exterior of the measuring probe 2 which falsifies the temperature measurement value.

The three measured variables static pressure, dynamic differential pressure and temperature can be used to determine the mass flow of a fluid.

Advantageously, the housing of the sensor unit is to be provided with a surface which has a so-called nanostructure either completely or at least partially in the region of the measuring probe 2.

The result of this nanostructure is that particles transported in the fluid cannot deposit permanently on the surface of the measuring probe.

Figure 3:
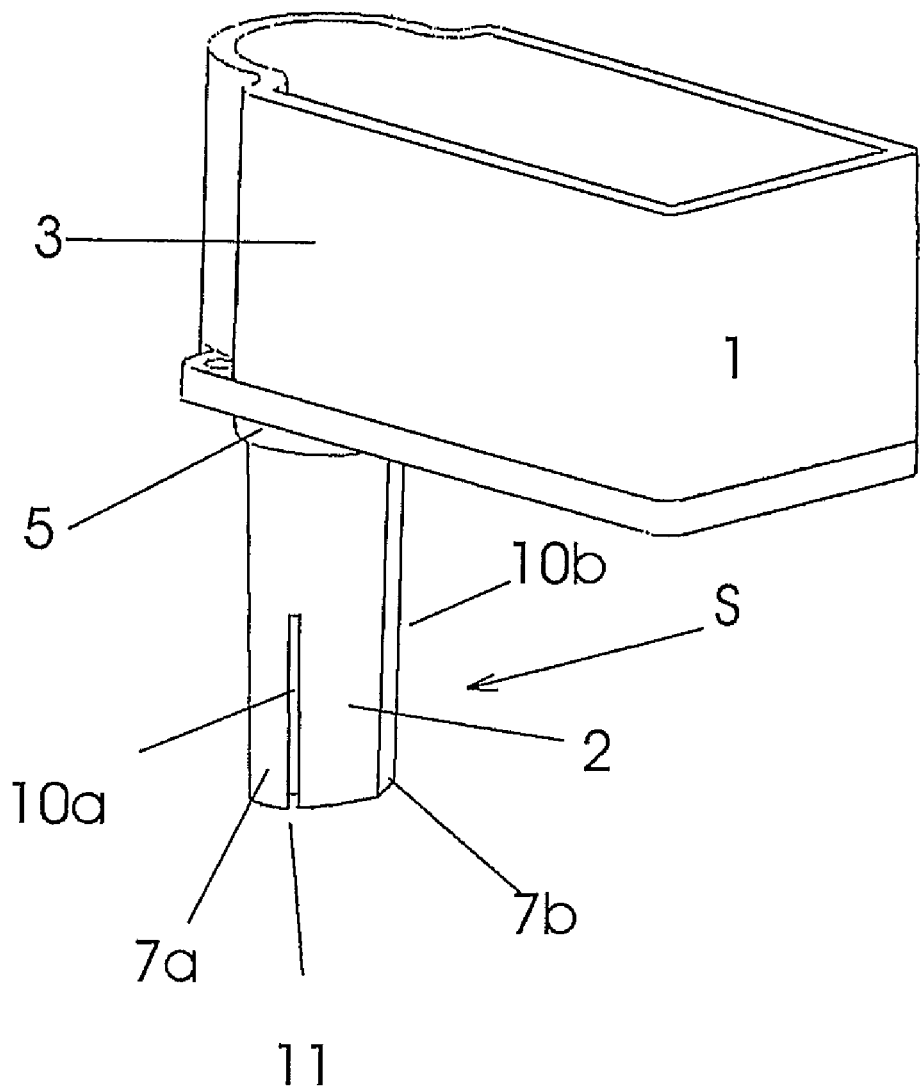

FIG. 3 shows an embodiment of the measuring probe which is particularly simple in terms of production complexity.

Here, slots 10a and 10b are provided in the measuring probe. Only one of the slots can be seen in the illustration selected. These slots are in each case located in the outer wall of the two ducts which lead to the differential-pressure sensor in the housing part. The connecting wall between the two ducts is unchanged and is used as ram-pressure surface.

The length of the slots yields a certain mean-value function if the flow rate of the fluid is different at different locations of the slot.

The integration of an additional gas analysis sensor 15 can be used to also determine the level of harmful substances or condensates in the fluid. This gas analysis sensor requires contact with the flowing fluid in principle.

Even if this gas analysis sensor 15 is subject to a drift of the measurement values, the inventive design of the other sensors can be used to advantageously ensure that not all the sensors are subject to a drift. This combination is in any case also novel.

The one computing unit 16 and the sensors for the dynamic differential pressure and the sensor for the static pressure are accommodated in the housing part 3 in a protected manner.

The temperature sensor 9 and/or the gas analysis sensor 15 are also connected to the computing unit 16. The computing unit 16 outputs a measurement value which results from the individual values of the different sensors.

The computing unit 16 is of flexible design and can be adapted to different requirements from subsequent control units.

INDUSTRIAL APPLICABILITY

The invention is industrially applicable in many fields where long-term stability of the measurement values if important.

The invention claimed is:

1. A sensor unit for fluids, comprising:
   a measuring probe which is in contact with a fluid, and
   a housing part including sensors and a computing unit integrated therein, and
   the measuring probe formed with a plurality of ducts for detecting a dynamic differential pressure and an additional duct for detecting a static pressure,
   the plurality of ducts and the additional duct connected to the sensors in the housing part, and
   the housing part connected to the measuring probe.

2. The sensor unit as claimed in claim 1, wherein a temperature sensor is additionally provided in the measuring probe.

3. The sensor unit as claimed in claim 1, wherein a gas analysis sensor is additionally provided in the measuring probe.

4. The sensor unit as claimed in claim 1, wherein slots are made in an outer wall in each of the plurality of ducts which lead to the differential-pressure sensor in the housing part and a wall which remains between the plurality of ducts is used as a ram-pressure surface.

5. The sensor unit as claimed in claim 1, wherein the sensor unit has, completely or partially, a surface with a nanostructure.

6. The sensor unit as claimed in claim 5, wherein the measuring probe has a surface with a nanostructure.

7. The sensor unit as claimed in claim 1, wherein the computing unit outputs a value that takes a temperature of the fluid into account.

8. The sensor unit as claimed in claim 1, wherein the computing unit outputs a value that takes the dynamic differential pressure, the static pressure, and a temperature of the fluid into account.

9. The sensor unit as claimed in claim 1, wherein each of the plurality of ducts for detecting the dynamic differential pressure communicate with the fluid and the housing part.

10. The sensor unit as claimed in claim 1, wherein:
    the measuring probe is formed with slots that communicate with the plurality of ducts for detecting the dynamic differential pressure,
    the slots have a length yielding a mean value function, and
    the measuring probe is formed with an opening that is directed downward when the measuring probe is in the fluid flow.

11. The sensor unit as claimed in claim 1, wherein the computing unit outputs a value that takes the dynamic differential pressure and the static pressure into account.

* * * * *